US011872753B2

(12) United States Patent
Champion et al.

(10) Patent No.: US 11,872,753 B2
(45) Date of Patent: Jan. 16, 2024

(54) FREQUENCY CONTROL OF SPREADER VIBRATIONS

(71) Applicant: HEWLETT-PACKARD DEVELOPMENT COMPANY, L.P., Spring, TX (US)

(72) Inventors: David A. Champion, Corvallis, OR (US); Adriaan Spierings, St. Gallen (CH); Thomas Bauer, St. Gallen (CH)

(73) Assignee: Hewlett-Packard Development Company, L.P., Spring, TX (US)

( * ) Notice: Subject to any disclaimer, the term of this patent is extended or adjusted under 35 U.S.C. 154(b) by 7 days.

(21) Appl. No.: 17/049,498

(22) PCT Filed: Oct. 12, 2018

(86) PCT No.: PCT/US2018/055574
§ 371 (c)(1),
(2) Date: Oct. 21, 2020

(87) PCT Pub. No.: WO2020/076337
PCT Pub. Date: Apr. 16, 2020

(65) Prior Publication Data
US 2021/0237360 A1 Aug. 5, 2021

(51) Int. Cl.
*B29C 67/00* (2017.01)
*B29C 64/214* (2017.01)
(Continued)

(52) U.S. Cl.
CPC ............ *B29C 64/214* (2017.08); *B22F 10/37* (2021.01); *B22F 10/85* (2021.01); *B22F 12/60* (2021.01);
(Continued)

(58) Field of Classification Search
CPC .......... B22F 10/85; B22F 12/67; B28B 1/001; B28B 17/0081; B29C 64/214; B29C 64/393; B33Y 30/00; B33Y 50/02
See application file for complete search history.

(56) References Cited

U.S. PATENT DOCUMENTS 5,688,464 A * 11/1997 Jacobs .................. B33Y 40/00
427/601
6,799,959 B1 10/2004 Tochimoto et al.
(Continued)

FOREIGN PATENT DOCUMENTS

CN 201168783 Y 12/2008
CN 104802404 7/2015
(Continued)

OTHER PUBLICATIONS

Kim et al., Evaluation of welding performance of 20 kHz and 40 kHz ultrasonic metal welding, IOP Conf. Series: Materials Science and Engineering 248 (2017) (7 pages).
(Continued)

*Primary Examiner* — Ryan M Ochylski
(74) *Attorney, Agent, or Firm* — Shook, Hardy & Bacon L.L.P.

(57) ABSTRACT

In some examples, a controller receives measurement data responsive to operation of a vibrated spreader for use in dispensing a build material onto a target surface, and controls a frequency of a vibration of the spreader based on the measurement data.

14 Claims, 3 Drawing Sheets

(51) Int. Cl.
| | |
|---|---|
| *B33Y 30/00* | (2015.01) |
| *B33Y 50/02* | (2015.01) |
| *B29C 64/393* | (2017.01) |
| *B22F 10/85* | (2021.01) |
| *B22F 12/67* | (2021.01) |
| *B28B 1/00* | (2006.01) |
| *B28B 17/00* | (2006.01) |
| *B22F 12/60* | (2021.01) |
| *B22F 12/63* | (2021.01) |
| *B22F 12/90* | (2021.01) |
| *B22F 10/37* | (2021.01) |
| *B22F 10/14* | (2021.01) |
| *B22F 10/28* | (2021.01) |

(52) U.S. Cl.
CPC .............. *B22F 12/63* (2021.01); *B22F 12/67* (2021.01); *B22F 12/90* (2021.01); *B28B 1/001* (2013.01); *B28B 17/0081* (2013.01); *B29C 64/393* (2017.08); *B33Y 30/00* (2014.12); *B33Y 50/02* (2014.12); *B22F 10/14* (2021.01); *B22F 10/28* (2021.01)

(56) References Cited

U.S. PATENT DOCUMENTS

| | | | |
|---|---|---|---|
| 8,568,124 | B2 | 10/2013 | Brunermer |
| 8,911,226 | B2 | 12/2014 | Gunther et al. |
| 9,527,244 | B2 | 12/2016 | El-Siblani |
| 9,586,290 | B2 | 3/2017 | Buller et al. |
| 2009/0017219 | A1 | 1/2009 | Paasche et al. |
| 2013/0316081 | A1 | 11/2013 | Kovalcik |
| 2015/0115490 | A1 | 4/2015 | Reinarz |
| 2015/0258734 | A1 | 9/2015 | Okamoto |
| 2015/0266240 | A1 | 9/2015 | Okamoto et al. |
| 2016/0361872 | A1 | 12/2016 | El-Siblani |
| 2016/0361874 | A1 | 12/2016 | Park et al. |
| 2017/0239752 | A1 | 8/2017 | Buller et al. |
| 2017/0355100 | A1 | 12/2017 | Pateloup et al. |
| 2018/0015666 | A1 | 1/2018 | Honda |
| 2020/0180227 | A1* | 6/2020 | Voss .......................... B07B 1/40 |

FOREIGN PATENT DOCUMENTS

| | | |
|---|---|---|
| CN | 105436501 A | 3/2016 |
| CN | 107803502 A | 3/2018 |
| DE | 102016202696 | 8/2017 |
| EP | 3243584 | 11/2017 |
| WO | 2017/179006 A1 | 10/2017 |
| WO | WO-2017215870 A1 | 12/2017 |
| WO | WO-2020027805 | 2/2020 |

OTHER PUBLICATIONS

Wen-Long et al., Enhanced Working-Amplitude Distribution of Ultrasonic Wide-Blade Horn With the Use of a Wavetuning Plate, 19th International Congress on Acoustics Madrid, Sep. 2-7, 2007 (5 pages).
Wikipedia, Sonotrode last edited Aug. 9, 2015 (2 pages).
Lucas et al., Experimental and computational modelling of vibration performance of ultrasonic tools for manufacturing applications, UIA Symposium, 2002 (23 pages).

* cited by examiner

FREQUENCY CONTROL OF SPREADER VIBRATIONS

BACKGROUND

Additive manufacturing machines produce three-dimensional (3D) objects by building up layers of material. A type of an additive manufacturing machine is referred to as a 3D printing system. Additive manufacturing machines are able to receive as input a computer aided design (CAD) model or other digital representation of a physical 3D object to be formed, and build, based on the CAD model, the physical 3D object. The model may be processed into layers by the additive manufacturing machine, and each layer defines a corresponding part (or parts) of the 3D object.

BRIEF DESCRIPTION OF THE DRAWINGS

Some implementations of the present disclosure are described with respect to the following figures.

Figure 1:
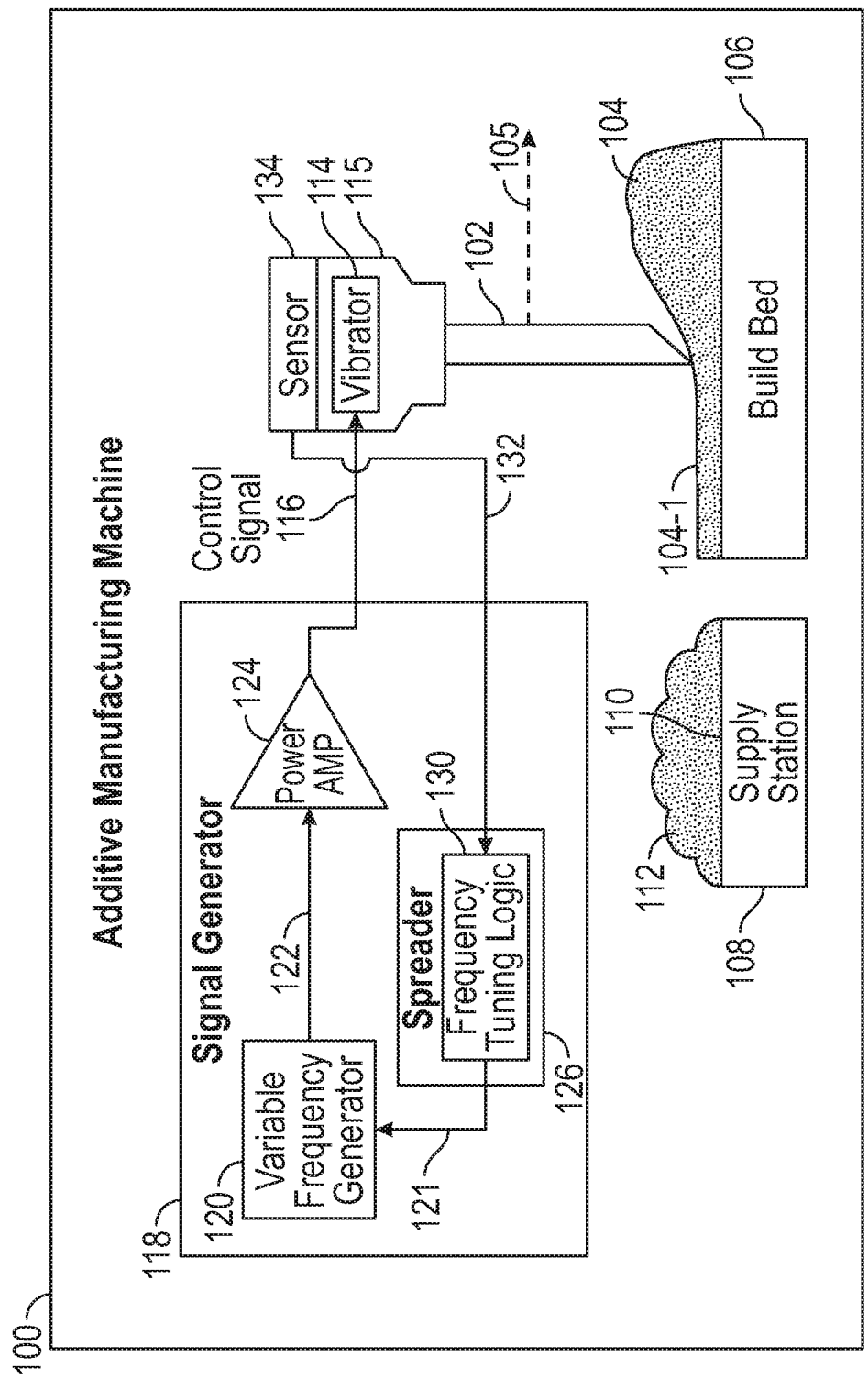
FIG. 1 is a block diagram of an additive manufacturing machine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An additive manufacturing machine such as a three-dimensional (3D) printing system can build 3D objects by forming successive layers of build material and processing each layer of build material on a build platform. In some examples, a build material can include a powdered build material that is composed of particles in the form of fine powder or granules. The powdered build material can include metal particles, plastic particles, polymer particles, ceramic particles, or particles of other powder-like materials. In some examples, a build material powder may be formed from, or may include, short fibers that may, for example, have been cut into short lengths from long strands or threads of material.

As part of the processing of each layer of build material, agents (more specifically, liquid agents) can be dispensed (such as through a printhead or other agent dispensing assembly) to the layer of build material as part of the processing the layer of build material). After a previous layer of build material is processed, a new layer of build material is deposited on top of the previously processed layer, and the process is re-iterated in a next additive manufacturing cycle to form 3D parts in each layers of build material.

A spreader can be used to dispense a layer of build material onto a target surface, which can include a surface of a build plate or the upper surface of previously processed layer(s) of build material. In some examples, the spreader can be in the form of a blade that is moveable along a dispensing direction to form a smooth layer of build material on a target surface. Instead of being in a shape of a blade, a spreader can have other shapes in other examples, such as a roller and so forth.

In some examples, while spreading a build material onto a target surface, a spreader can be vibrated at a certain vibration frequency. The spreader vibrations can include ultrasonic vibrations in some examples. The vibrations may be applied by the spreader in a vertical direction (e.g., a direction normal to the plane of the build material layer) and/or in a horizontal direction (e.g., a direction parallel to the plane of the build material layer).

In some examples, the frequency of vibration of the spreader is fixed. Using a fixed vibration frequency may not be optimal for different properties of layers of build material. For example, while vibrating the spreader at the fixed vibration frequency may be acceptable for a first type of build material, the fixed vibration frequency may produce a sub-optimal layer of build material for a different second type of build material.

Also, with use, a property of the spreader can change. For example, a physical property of the spreader can change due to a portion of the spreader being worn, such as due to abrasion by the build material contacted by the spreader. Wear of the spreader can cause a portion of the spreader to become rougher, thinner, etc. At the fixed vibration frequency, a spreader that has not been worn due to use may produce vibration amplitudes that produce layers of build material with acceptable characteristics (e.g., the layer of build material spread by the spreader has uniformly acceptable density and/or thickness and/or even surface). However, once the spreader has been worn due to use, the spreader vibrated at the fixed vibration frequency may produce a layer of build material with unacceptable characteristics (e.g., portions of the layer of build material may have a density lower than a target density, and/or the layer of build material can have non-uniform thickness, and/or the build material surface may be uneven, and/or densities of the build material layer may be uneven).

Additionally, different locations of a spreader may react differently to a fixed vibration frequency. In response to a fixed vibration frequency, some portions of the spreader may produce vibration amplitudes that are different from other portions of the spreader. As a result of different vibration amplitudes at different portions of the spreader, an uneven build material layer (such as in terms of thickness and/or density) may be formed on a target surface of the additive manufacturing machine.

Moreover, if a fixed vibration frequency is used, the locations of the spreader that are subjected to higher vibration amplitudes may wear out more quickly than the locations of the spreader that are subjected to lower vibration amplitudes.

In accordance with some implementations of the present disclosure, automated tuning is performed to adapt a frequency of vibration of a spreader for properties of a build material and/or the spreader. The automated tuning is based on measurement data received by a controller during a tuning procedure of the spreader.

FIG. 1 is a block diagram of an additive manufacturing machine 100, which in some examples can include a 3D printer. The additive manufacturing machine 100 includes a spreader 102 that is used to spread a build material 104 onto a build bed 106. The build bed 106 can either be a base plate (if a first layer of build material is being dispensed) or a previously formed layer. In examples according to FIG. 1, the spreader 102 is in the form of a blade. In other examples, the spreader 102 can have a different shape.

The spreader 102 is moved relative to the build bed 106 along a spreading direction 105, starting at a build material supply station 108. In other examples, the spreader 102 is moveable relative to the build bed 106 in multiple directions.

A dispensing surface 110 of the supply station 108 has a supply 112 of build material that is spread by the spreader 102 across the upper surface of the build bed 106 as the spreader 102 is moved in the spreading direction 105 across the surface of the build bed 106. The spreader 102 forms a build material layer 104-1 having a target thickness on the build bed 106.

The spreader 106 is vibrated as the spreader 102 spreads the build material 104 across the build bed 106. The vibration of the spreader is produced by a vibrator 114 of a coupling horn 115 to which the spreader 102 is mounted. The vibrator 114 causes ultrasonic vibration of the spreader 102 in response to a control signal 116 produced by a signal generator 118 of the additive manufacturing machine 100.

In some examples, the vibrator 114 includes a sonotrode, which is a mechanism that creates vibrations (e.g., ultrasonic vibrations) in response to a control signal, which can be an electrical signal having an oscillating frequency. In some examples, the sonotrode includes piezoelectric transducers that are mechanically coupled to the spreader 102. An oscillating control signal oscillating at a frequency applied to the piezoelectric transducers causes the piezoelectric transducers to produce a vibration that is transferred to the spreader 102.

In other examples, other types of vibrators 114 can be used for causing mechanical vibration of the spreader 102 in response to the control signal 116.

The signal generator 118 includes a variable frequency generator 120 that produces an oscillating signal 122 having a frequency. For example, the variable frequency generator 120 can include an oscillator and associated circuitry. The oscillator produces an oscillating signal (e.g., a sinusoidal signal, a square wave, or any other signal that oscillates at a given frequency) based on control information 121 from a spreader controller 126. The control information 121 can set the frequency of oscillation of the oscillator.

The oscillating signal 122 is supplied to a power amplifier 124 that supplies a gain to the oscillating signal 122 to produce the control signal 116. In other examples, the power amplifier 124 can be part of the signal generator 118.

The variable frequency generator 120 is able to vary the frequency of the oscillating signal 122 based on the control information 121. In some examples, the variable frequency generator 120 is able to sweep the oscillating signal 122 across a range of frequencies (referred to as a "frequency sweep").

The range of frequencies can be centered at a center frequency, and can start at a lower bound frequency and end at an upper bound frequency. The frequency sweep of the oscillating signal 122 can be a continuous frequency sweep, where the variable frequency generator 120 continuously increases or decreases the oscillating signal frequency between the lower bound frequency and the upper bound frequency. In other examples, the frequency sweep of the oscillating signal 122 can be a discrete frequency sweep, where the variable frequency generator 120 incrementally increases or decreases the oscillating signal frequency between the lower bound frequency and the upper bound frequency at specified frequency steps (frequency increments or frequency decrements).

The range of frequencies centered at the center frequency can be indicated by the control information 121 provided by the blade controller 126. As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The spreader controller 126 can control an operation of the spreader 106. For example, the spreader controller 126 can control relative movement between the spreader 102 and the build bed 106. The spreader controller 126 can control movement of either the spreader 102 or the powder build bed 106, or both, to cause the spreader 106 to move (e.g., in the spreading direction 105) relative to the build bed 106.

In some examples, the spreader controller 126 further includes a frequency tuning logic 130. The frequency tuning logic 130 can either be implemented as a portion of the hardware processing circuit of the spreader controller 126, or can be implemented as machine-readable instructions executable by the spreader controller 126. Alternatively, the frequency tuning logic 130 can be separate from the spreader controller 126.

The frequency tuning logic 130 receives measurement data 132 from a sensor 134 that is able to measure a vibrational characteristic of the spreader 102 during an operation of the spreader 102, such as during a tuning procedure. The sensor 134 can measure any of various characteristics that corresponds to vibration of the spreader 102. For example, the sensor 134 can include a strain gauge that measures forces of the spreader 102 caused by vibration of the spreader 102. In other examples, the sensor 134 can include an electrical sensor to measure an electrical current or electrical power (more generally, electrical measurement data) corresponding to vibrations of the spreader 102. The electrical measurement data produced by the electrical sensor can provide an indication of a vibration characteristic of the spreader 102. In other examples, other types of sensors can be employed. Moreover, multiple different types of sensors can be used in combination to produce the measurement data 132.

The frequency tuning logic 130 can determine, based on the measurement data 132, a resonant frequency of the spreader 102. The spreader 102 may be excited under several modes, where each mode represents a standing wave state of excitation that vibrates the spreader 102. A mode of vibration is characterized by a modal frequency. Each mode of vibration can be referred to as a resonant frequency.

In some examples, the frequency tuning logic 130 can identify each resonant frequency of the spreader 102 as a frequency to avoid (i.e., a frequency not to be included in the range of frequencies associated with the frequency sweep).

Additionally or alternatively, a vibration frequency identified to not include in a frequency sweep of the spreader 102 can include a frequency at which a vibration amplitude of the spreader 102 is below a specified threshold. At certain frequencies, the amplitude of vibration of the spreader 102 may be too low to be effective when spreading the build material 104 on the build bed 106.

In some examples, a center frequency of the frequency sweep can be set at M (where M is a specified frequency value), with a range of frequencies of the frequency sweep set at ±m (where m is a specified frequency value) from the center frequency of M kHz. In ultrasonic applications, M can be set to 20 kilohertz (kHz) or more, and m can be some number of kHz. In other examples, M can be greater than 10 kHz.

The frequency tuning logic 130 can adjust the value of M and/or m based on the measurement data 132, to automatically tune the vibration frequency of the spreader 102 to account for properties of the spreader 102 and/or the build material 104. Properties of the spreader 102 and the build material 104 can determine which frequency (or frequencies) is (are) optimal for forming a build material layer 104-1 of uniform thickness and/or density. More specifically, properties of the spreader 102 and the build material 104 can affect resonant frequencies (at the different modes) of the spreader 102 and can affect frequencies at which the spreader 102 produces a vibration amplitude less than a specified threshold. By perform automatic tuning of the vibration frequency of the spreader 102 based on the measurement data 132 during a tuning procedure, the build material layer 104-1 can be formed with more optimal characteristics (e.g., density and/or thickness).

By performing the tuning procedure on an intermittent basis or on demand (e.g., as requested by the user or by a program or machine), variations in properties of the spreader 102 (such as due to wear) and/or variations in properties of the build material (e.g., due to use of different types of build material, variations in thicknesses of build material at different stages of a build operation, etc.) can be compensated for by adjusting the vibration frequency of the spreader 102.

The control information 121 provided by the spreader controller 126 to the variable frequency generator 120 can also specify a time duration over which the frequency sweep is to occur. For example, the time duration can be set between 10 milliseconds (ms) and 1 second (or other example time durations).

The tuning procedure to set the control information 121 can be performed at the beginning of a build operation for building a 3D object by the additive manufacturing machine 100. Alternatively, the tuning procedure can be performed each time the additive manufacturing machine 100 is started (e.g., turned on or activated from a sleep state). As yet a further example, the tuning procedure can be performed before each layer of build material is dispensed, or after dispensing every N layers of build material on the build bed 106 (where N is a specified number of 1 or greater than 1). As another example, the tuning procedure can be performed on demand of a user, a program, or a machine.

By performing a frequency sweep, the locations of the spreader 102 associated with low vibration amplitudes and high vibration amplitudes can be spread or averaged across the frequency sweep, to improve vibration amplitude uniformity across the width of the spreader 102, and to distribute wear along the spreader 102.

Figure 2:
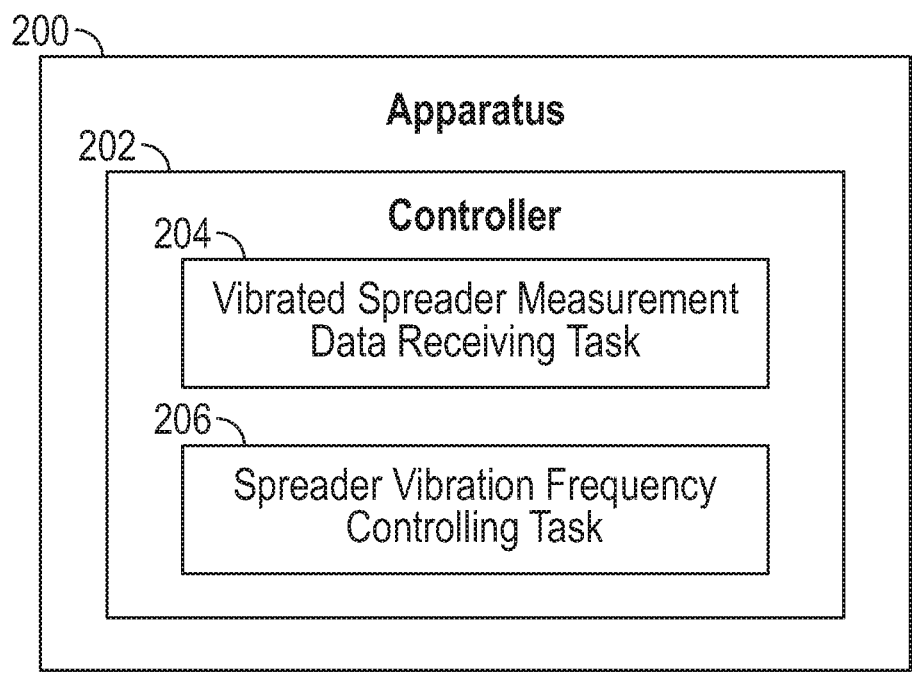
FIG. 2 is a block diagram of an apparatus for use with an additive manufacturing machine, according to some examples.

FIG. 2 is a block diagram of an apparatus 200 for use with an additive manufacturing machine (e.g., 100 in FIG. 1). The apparatus 200 includes a controller 202 that is configured to perform various tasks. The controller 202 is configured to perform various tasks based on a configuration of the hardware processing circuit of the controller 202, or based on machine-readable instructions executable on the controller 202.

The tasks of the controller 202 include a vibrated spreader measurement data receiving task 204 to receive measurement data (e.g., 132 in FIG. 1) responsive to operation of a vibrated spreader (e.g., 102 in FIG. 1) for use in dispensing a build material onto a target surface. The tasks of the controller 202 also include a spreader vibration frequency controlling task 206 to control a frequency of a vibration of the spreader based on the measurement data.

Figure 3:
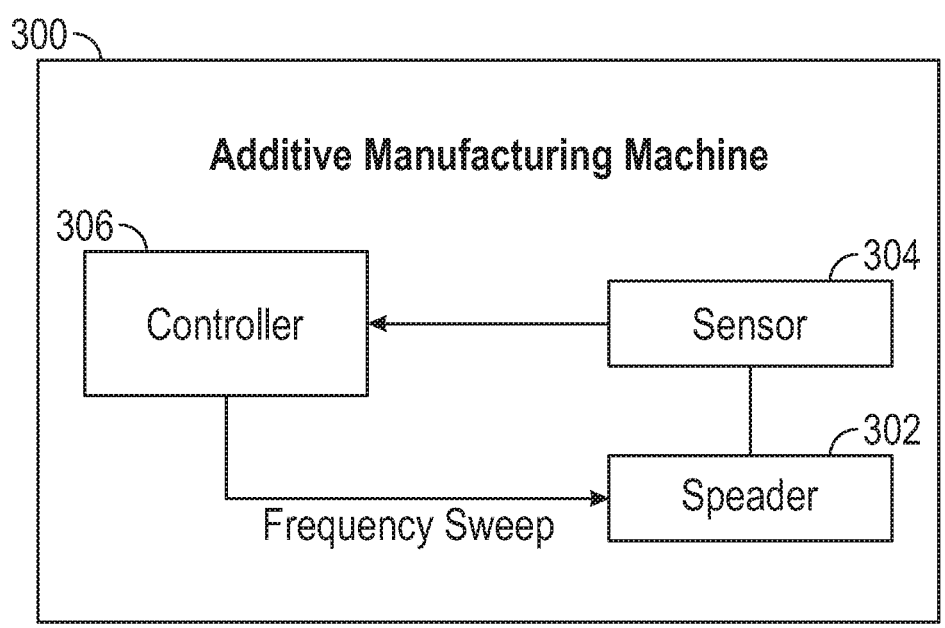
FIG. 3 is a block diagram of an additive manufacturing machine according to further examples.

FIG. 3 is a block diagram of an additive manufacturing machine 300 according to further examples. The additive manufacturing machine 300 includes a spreader 302 to dispense a build material to a target surface, and a sensor 304 to measure a vibrational characteristic of the spreader 302 during an operation of the spreader 302. The additive manufacturing machine 300 further includes a controller 306 to control, based on the measured vibrational characteristic, a sweep of a frequency of vibration of the spreader 302 across a range of frequencies as the spreader 302 is moved over the build bed.

Figure 4:
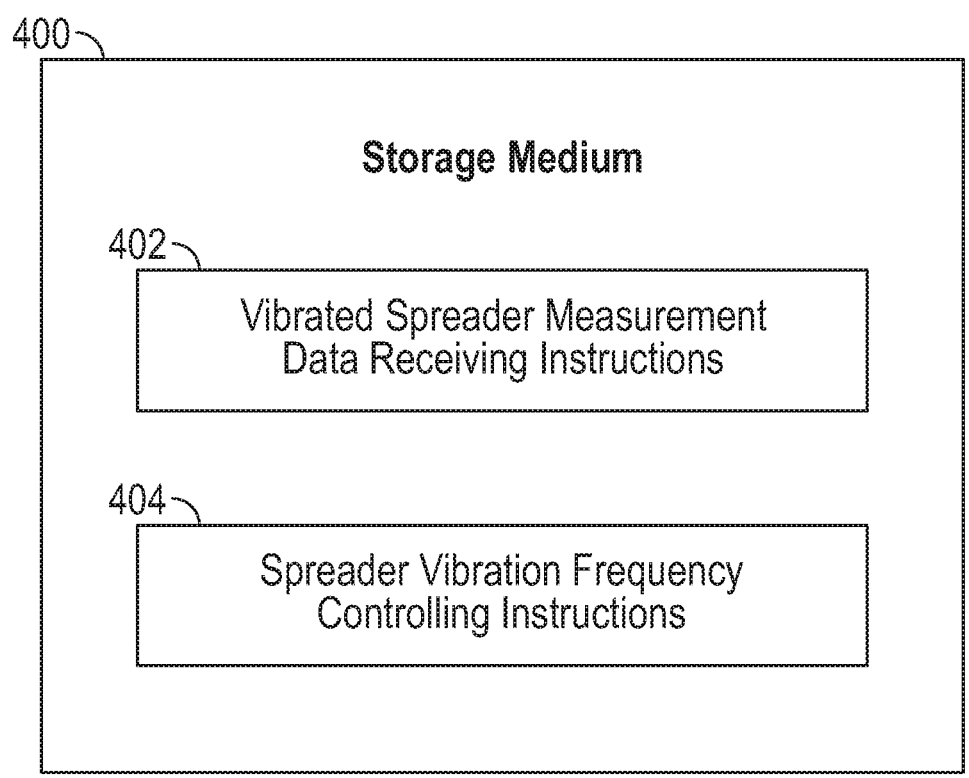
FIG. 4 is a block diagram of a storage medium storing machine-readable instructions according to some examples.

FIG. 4 is a block diagram of a non-transitory machine-readable or computer-readable storage medium 400 comprising machine-readable instructions that upon execution cause a controller to perform various tasks. The machine-readable instructions include vibrated spreader measurement data receiving instructions 402 to receive measurement data responsive to vibrations of a spreader across a range of frequencies, the spreader for use in dispensing a build material onto a target surface. The machine-readable instructions further include spreader vibration frequency controlling instructions 404 to control a frequency of a vibration of the spreader based on the measurement data.

The storage medium 400 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus for use with an additive manufacturing machine, comprising:
a controller to:
receive measurement data from a sensor responsive to an operation of a vibrated spreader for use in dispensing a build material onto a target surface;
identify, based on the measurement data from the sensor, a resonant frequency associated with the spreader at which the spreader is not to be vibrated;
identify, based on the measurement data from the sensor, a further frequency at which an amplitude of a vibration of the spreader is below a threshold; and
control, based on identifying the resonant frequency associated with the spreader and based on identifying the further frequency at which the amplitude of the vibration of the spreader is below the threshold, a frequency of the vibration of the spreader.

2. The apparatus of claim 1, wherein the controller is to control the frequency of the vibration of the spreader by sweeping the vibration of the spreader across a range of frequencies while the spreader is moved over a build bed.

3. The apparatus of claim 2, wherein the sweeping of the vibration of the spreader across the range of frequencies comprises a continuous frequency sweep or a frequency sweep at discrete frequency steps.

4. The apparatus of claim 2, wherein the range of frequencies excludes the resonant frequency.

5. The apparatus of claim 4, wherein the resonant frequency is based on properties of the spreader and the build material.

6. The apparatus of claim 4,
wherein the range of frequencies also excludes the further frequency.

7. The apparatus of claim 1, wherein the measurement data is based on a property of the build material, and wherein the frequency is controlled for the property of the build material.

8. The apparatus of claim 1, wherein the measurement data is based on a property of the spreader, and wherein the frequency is controlled for the property of the spreader.

9. The apparatus of claim 1, wherein the controller is to receive the measurement data as part of a tuning procedure that is performed prior to a build operation or prior to processing of a layer of the build material.

10. An additive manufacturing machine comprising:
a spreader to dispense a build material to a target surface;
a sensor to output measurement data based on a measurement of a vibrational characteristic of the spreader during an operation of the spreader; and
a controller to:
identify, based on the measurement data from the sensor, a resonant frequency associated with the spreader at which the spreader is not to be vibrated;
identify, based on the measurement data from the sensor, a further frequency at which an amplitude of a vibration of the spreader is below a threshold; and
control, based on identifying the resonant frequency associated with the spreader and based on identifying the further frequency at which the amplitude of the vibration of the spreader is below the threshold, a sweep of a frequency of vibration of the spreader across a range of frequencies.

11. The additive manufacturing machine of claim 10, wherein the range of frequencies excludes the resonant frequency.

12. The additive manufacturing machine of claim 11, wherein the range of frequencies also excludes the further frequency.

13. The additive manufacturing machine of claim 10, further comprising:
a variable frequency generator controlled by the controller to produce the sweep of the frequency of vibration.

14. A non-transitory machine-readable storage medium comprising instructions that upon execution cause a controller to:
receive measurement data from a sensor responsive to vibrations of a spreader across a range of frequencies, the spreader for use in dispensing a build material onto a target surface;
identify, based on the measurement data from the sensor, a resonant frequency associated with the spreader at which the spreader is not to be vibrated;
identify, based on the measurement data from the sensor, a further frequency at which an amplitude of a vibration of the spreader is below a threshold; and
control, based on identifying the resonant frequency associated with the spreader and based on identifying the further frequency at which the amplitude of the vibration of the spreader is below the threshold, a frequency of the vibration of the spreader.

* * * * *